United States Patent Office 3,515,981
Patented June 2, 1970

3,515,981
SUPER-REGENERATIVE RESONANCE SPECTROMETERS
John Alec Sydney Smith, Leamington Spa, England, and David Arthur Tong, Kirkintalloch, Scotland, assignors to Decca Limited, London, England, a British company
Filed Jan. 31, 1968, Ser. No. 701,905
Claims priority, application Great Britain, Feb. 13, 1967, 6,822/67
Int. Cl. G01n 27/78
U.S. Cl. 324—.5                                 5 Claims

ABSTRACT OF THE DISCLOSURE

A nuclear quadrupole resonance spectrometer in which the quench period is invariant with quench frequency and is varied independently of the quench frequency to provide automatic gain stabilisation of the spectrometer. A detector of random noise in the output of the spectrometer provides a control signal for varying the "on" period of a monostable multivibrator which is triggered by an astable multivibrator at a frequency that is varied to provide "sideband suppression."

---

This invention relates to super-regenerative resonance spectrometers. The invention will be particularly described with reference to spectrometers adapted to or capable of detecting nuclear quadrupole resonance (NQR) but the invention may be applicable to other types of resonance spectrometers, for example those for detecting nuclear magnetic resonance.

Resonance spectrometers, of whatever form, are essentially instruments for detecting one or more frequencies associated with electric or magnetic dipole transitions in a sample. Such transitions are essentially changes in the state of part of a nuclear system from one energy level to another and are associated with a frequency or frequencies, normally termed a line or band, related to the transition such that the difference in the two energy levels associated with the transition is equal to the product of Planck's constant and the respective frequency. The particular transitions are characteristic of the material of the sample and accordingly by determining the particular lines or bands in an absorption spectrum it is possible to determine or partially determine the nature of the material in the sample.

Thus a resonance spectrometer is an instrument which is used to detect a number of previously unknown frequencies. In nuclear quadrupole resonance for example, a spectrometer is used to detect changes in the orientation of a quadrupolar nucleus in the electric field gradient of its environment. These changes give rise to absorption at frequencies in the radio frequency band, typically 3 mHz. to 1000 mHz., the precise frequencies depending on the magnitude of the nuclear quadrupole moment and the electric field gradient to which the nucleus is subjected.

There are several ways of determining the particular frequencies in an absorption spectrum characteristic of any particular material. At the present time, the most versatile instrument used for this type of spectroscopy is the super-regenerative resonance spectrometer, which operates in a manner similar to a super-regenerative radio receiver. Its method of operation is briefly as follows. An oscillator, normally called the super-regenerative oscillator, is arranged to produce a continuous radio frequency signal whose frequency may be varied over a fairly wide range. There is provided a quench waveform generator which alternately renders the super-regenerative oscillator oscillatory and non-oscillatory by applying, for example, to some suitable point in the oscillator, positive and negative pulses to make a valve conducting or nonconducting. There is accordingly a repeated build-up and decay of oscillations in the regenerative oscillator. The oscillations build up when the quench signal is not applied and decay when the quench signal is applied during a "damping period." Various modes of operation of the device are possible. In one common one, the logarithmic mode, the radio frequency oscillations are allowed to build-up to a value determined by the nonlinearities of the oscillator and continue at this value until the quench waveform is applied during the damping period whereupon the oscillations decay to a low value. It may readily be shown, for example in "Super-regenerative Receivers" by J. R. Whitehead, Cambridge University Press, 1950, that the presence of a radio frequency signal in the oscillator's tank circuit during the damping period and in particular at the instant when the damping is removed produces a change in the area of the envelope of the (radio) frequency during one cycle of the quenched frequency. By feeding the radio frequency waveform to an appropriate detector responsive to the low frequency envelope of the radio frequency waveform (for example a linear, square law or other appropriate detector) the original variations in the amplitude of the radio frequency signal in the tank circuit may be recovered. The standard procedure for finding a resonance or absorption frequency is to sweep the oscillator frequency slowly over a wide range and to determine or indicate those frequencies at which a significant change in the output from the detector occurs. It is possible for example to drive a chart recorder in synchronism with the sweep in frequency of the oscillator and to operate a pen such that its deflection is proportional to the amplitude of the detector output. A graph on the chart may show the absorption spectrum of the sample under test.

The above discussion of the operation of a super-regenerative resonance spectrometer has been given in order that the problems to which the present invention is directed may be fully understood. The first important problem is: since the amplitude of the detector output is used to determine the lines in the absorption spectra, the gain of the receiver must be carefully controlled. It is well known, and will be shown later in this specification, that the gain of the detector depends, inter alia, on the quench frequency. Since noise signals and nuclear quadrupole resonance signals are or should be amplified equally by a super-regenerative detector it has been proposed to use part of the detector output, after removal of the quench frequency by filtering, as negative feedback to control the quench frequency in order to maintain the output random noise level as constant as possible and thereby stabilise the gain of the detector.

A super-regenerative detector employing such feedback has been described, for example by Dean (Rev. Scientific Inst., 29, 1047 (1958)). This used a self-quenched detector; other previously known spectrometers have used external quenching by a waveform having constant mark-to-space ratio, so that the damping period ($t_{OFF}$) varies inversely with frequency. It will be shown later however that it is the change in $t_{OFF}$ which mainly affects the gain, the actual quench frequency having only a relatively small effect on the gain of the circuit. If the actual quench frequency were unimportant, the gain control methods described above would be quite satisfactory, but this is not the case for the following reasons:

The Fourier components of the radio-frequency waveform in a super-regenerative oscillator tank circuit comprise a signal ($f_0$) near the natural resonant frequency of the tuned circuit, flanked by so-called "sidebands" with frequencies given by $f_0 \pm nf_q$, where $f_q$ is the quench frequency and $n$ is a positive integer. Many of these signals have sufficient amplitude to excite the nuclear resonance when the spectrometer is tuned so that the appropriate component is near to the resonance frequency. The result is that one resonance absorption in the sample gives rise to a number of apparent resonances, henceforth called sidebands, in the spectrometer output. Only one of these "resonances" (which are spaced by the quench frequency) is the response required i.e. the one where $f_o$ is equal to the resonance frequency. The sidebands can be identified by varying the quench frequency, whereupon the sidebands change frequency and the fundamental does not. Furthermore, if the quench frequency is varied back and forth over a suitable range at a rate fast compared to the response time of a recording system, the sideband responses are not recorded and only the fundamental response appears. This method of "sideband suppression" has previously been used by Dean & Pollack (Rev. Sci. Inst., 29, 630–632 (1958)). Thus, control of quench frequency is required in order to obtain sideband suppression.

It follows therefore that existing methods of automatic gain control and of sideband suppression are incompatible since both rely on varying the quench frequency. Furthermore, existing sideband suppression methods are complicated by the considerable fluctuations in gain which accompany the quench frequency variations and various methods of compensation of the gain changes have been used. The result has been that sideband suppression has been rarely used and therefore the spectrometers have been difficult to operate and have often been unreliable in their determination of absorption frequencies.

According to this invention there is provided in a super regenerative resonance spectrometer a quench waveform generator arranged to provide a quench waveform of adjustable frequency and having a damping period which is invariant with quench frequency.

Conveniently there are provided means for altering the damping period independently of the quench frequency.

This invention enables wide range automatic gain control to be achieved, independently of whether sideband suppression is in use or not at the same time and makes the spectrometer very much simpler to use. These advantages depend on using a quench waveform of special shape i.e. one in which the damping period is independent of the quench frequency and which may be separately varied to provide gain control. To ensure a very wide range of gain control, the degree of the damping action during the damping period may also be controlled. In effect the gain of the detector is controlled by the damping period and the extent of the damping in that period, while the positions of the sidebands are determined only by the number of damping periods per second.

A spectrometer in which the damping period is maintained invariant with quench frequency is substantially simpler and more accurate than previously known instruments.

Another advantage of the present invention, deriving from the separation of quench frequency and damping period, is that it is possible to vary the damping period to control the gain independently of any variation in the quench frequency.

In one embodiment of the invention, there may be provided a monostable (one-shot) multivibrator arranged to be triggered by a variable frequency generator (typically a voltage controlled astable multivibrator) to provide the quenching waveform, which may be applied to the super-regenerative oscillator to provide quenching in any convenient manner. A particularly advantageous manner of quenching will be described below. With this embodiment, the duration of the pulse from the monostable multivibrator may be selected to give the optimum value or range of gain and then maintained constant during sideband suppression effected by varying the quench frequency. There may be provided means responsive to random noise in the output of the detector (effectively the output of the spectrometer) providing a feedback signal to control the length of the damping period. The feedback signal used to control the damping period may also be used to control $G_o$, a conductance in parallel with the super-regenerative oscillator's tank (resonant) circuit when oscillations are being damped.

With these features, the detector may be maintained always in correct adjustment automatically.

The quench frequency can be varied manually, for example by varying a control voltage applied to a voltage controlled astable multivibrator or by providing a triangular voltage waveform generator to control the voltage controlled astable multivibrator. Since a comparatively simple, linear, compensation circuit may compensate for changes in gain during sideband suppression much wider quench frequency swings are practicable.

It has been found with the present invention that much lower quench frequencies can be used than hitherto, typical values being as low as 200 cycles per second. Since it is possible to vary the damping period independently of the other parameters the present invention makes it possible to determine the variation of signal to noise ratio with damping period. This may provide a means of determining relaxation times associated with the aforementioned transitions and may provide a spectrometer with greatly enhanced versatility.

With all spectrometers, it is necessary to provide frequency calibration in order that the absorption frequencies may be assigned numerical values. Particularly suitable for use with the present invention but applicable to other types of spectrometers is a frequency calibrator which comprises means for mixing the envelope of the radio frequency oscillations in the spectrometer with a further signal comprising a fundamental and a plurality of harmonics. The further signal may be a frequency such as 25 kc./s. Then as the spectrometer is swept in frequency, a series of zero beats occurs as each oscillator sideband sweeps in turn past each harmonic. When sideband suppression is not in use, i.e. the quench frequency is being maintained constant, the quench frequency is derived from a common frequency source so that it is a small multiple or sub-multiple of the interval between the harmonics. The zero beats may be used to calibrate one ordinate of a chart recording paper so that determination of the absorption frequencies is rendered virtually automatic, enabling results to be obtained quickly without requiring highly skilled operators.

The present invention will now be more particularly described by way of example with reference to the the accompanying drawings in which:—

Figure 1:
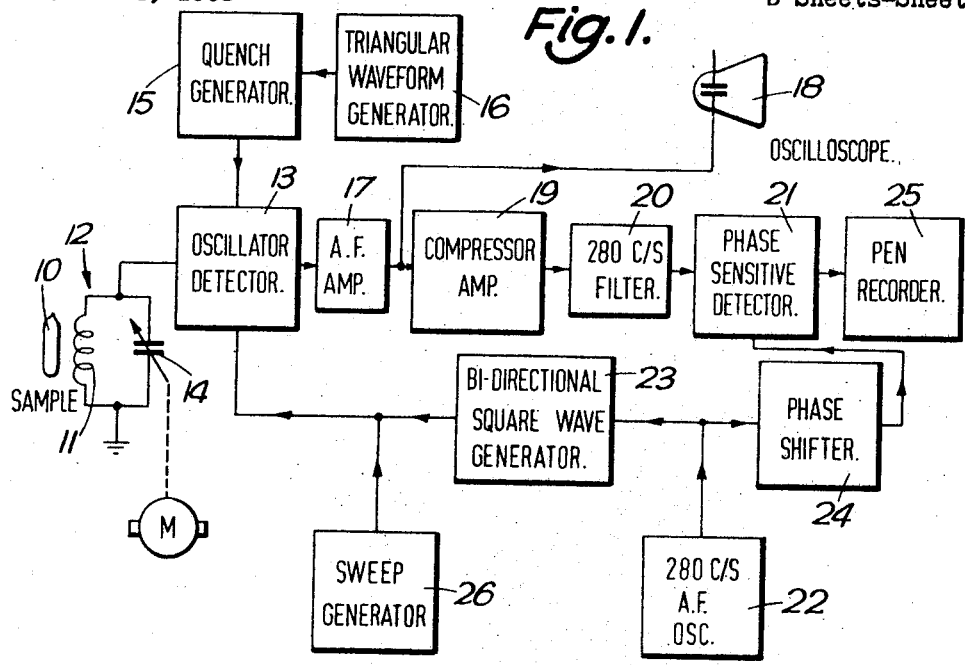
FIG. 1 illustrates diagrammatically a known form of super regenerative resonance spectrometer.

In order that the present invention may be fully understood the operation of a known type of NQR spectrometer will first be described. Such a spectrometer is shown in block diagram form in FIG. 1. A sample of material whose absorption spectrum is to be determined is shown referenced at 10. A search coil 11 is placed adjacent the sample, the search coil forming part of a tank circuit 12 for a super-regenerative detector 13. The detector 13 comprises a conventional radio frequency oscillator, for example a Colpitts oscillator with a conventional detector circuit of a kind described by Whitehead (vide supra) or in other publications. Variation of the oscillator frequency may be effected by means of a sweep motor M controlling a variable capacitance 14 in the tank circuit. A quench waveform generator 15 providing a quenching waveform for the detector 13 is swept in frequency by a triangular waveform generator 16. In previously known spectrometers the quench waveform generator has produced a waveform of variable frequency but of constant mark-to-space ratio.

The audio-frequency output from the detector 13 is amplified by an amplifier 17 and one output thereof is displayed on an oscilloscope 18. Another output from the amplifier 17 is amplified again by an amplifier 19, filtered by a narrow band pass filter 20 and fed to one input of a phase sensitive detector 21. The purpose of this detector needs some explanation. Many NQR signals are much weaker than the noise level and it is desirable to increase the signal to noise ratio as much as possible. One method is to modulate the oscillator frequency and then, using a filter, to pick out signals at the modulation frequency. In FIG. 1, an audio frequency oscillator 22 produces a modulating signal at a suitable frequency such as 280 cycles per second, one output of the oscillator 22 being used to synchronise a bi-directional square waveform generator 23, operating at a fundamental frequency of 140 c./s. The output of the generator 23 is used to modulate the radio frequency signal in the detector 13. The wanted signal at 280 cycles per second is extracted by the filter 20 and applied as mentioned before to one input of the phase sensitive detector 21. Another output from the oscillator 22 in phase shifted by a phase shifter 24 and fed to another input of the phase sensitve detector. The phase sensitive detector mixes the modulated resonance signal with the phase shifted reference signal at 280 c./s. in a balanced mixer. If the phase of the reference signal is adjusted correctly it may be shown that the output of the mixer is at zero frequency for signals exactly at the reference frequency and that noise signals on either side of this frequency are translated into frequencies close to zero. If a low pass filter follows the mixer it may be shown that the effective recording band width is four times the time constant of the low pass filter. The amplitude of the direct output is substantially greater than the noise output at low frequencies and may be used to operate a pen recorder 25.

In order to provide a stationary display on the oscilloscope, the spectrometer frequency can be varied repeatedly over a limited range at a frequency of the order of 50 c./s. This may be effected by means of a sweep generator 26 providing an appropriately varying output which is combined with that of the generator 23.

The circuit shown in FIG. 1 does not show explicitly the control of quench frequency when automatic gain control is to be used. This may be done in the following manner. A band stop filter may serve to remove all signals at the modulation frequency of 140 c./s. and harmonics thereof and all quench frequency voltages, the remaining noise signals being amplified and rectified. The resultant output may be smoothed and then applied to a voltage controlled multivibrator via an RC network of large time constant to ensure stability of the feedback loop. The loop gain may be adjusted to be as high as possible consistent with stability.

The disadvantages of the circuit of the kind shown in FIG. 1 have been hereinbefore discussed. There now follows a short theoretical discussion of the various parameters affecting the gain of the spectrometer, during which discussion reference will be made to FIG. 2 which shows a quench waveform 28 and the positive half 29 of the envelope of a radio frequency oscillation in the tank circuit of a super-regenerative oscillator operating in the logarithmic mode in which the radio frequency signals are permitted to build-up to a limited maximum value and to continue at that value until the damping period of the quench waveform begins.

Oscillations will build up from either of two small radio frequency voltages $V_1$ or $V_2$ at the instant when a preceding damping pulse is removed at $T=0$. $V_1$ represents the voltage in the tank circuit due to random noise fluctuations and the remnants of the previous pulse and $V_2$ represents, in addition, a signal voltage. Owing to the random nature of noise we must use root means square values of all the voltages concerned averaged over many quench cycles.

If $V_R = \hat{V}_R \cos 2\pi f_0 t$, where $f_0$ is the oscillator frequency, represents the "tail" of the previous pulse at $t=0$, and $V_I = \hat{V}_I \cos 2\pi f_0 t$ the signal voltage induced in the tank circuit by the sample, their RMS values, are, respectively, $$\frac{\hat{V}_R}{\sqrt{2}} \text{ and } \frac{\hat{V}_I}{\sqrt{2}}$$

Then, if $V_n^2$ is the RMS noise voltage, we have $$V_1 = \left(\overline{V}_n^2 + \frac{\hat{V}_R^2}{2}\right)^{1/2} \quad (1)$$

and $$V_2 = \left(\overline{V}_n^2 + \frac{\hat{V}_3^2}{2}\right)^{1/2} \quad (2)$$

where $$\hat{V}_3^2 = (\hat{V}_R + \hat{V}_I)^2 \quad (3)$$

The signal voltage output of the detector ($V_{out}$) is proportional to the change in pulse area ($\Delta A_S$) caused by the signal voltage, and to the number of quench pulses per second ($f_q$), thus $$V_{out} = k f_q \Delta A_S$$

where $k$ is a constant of proportionality. The change in pulse area is found by integrating the two build-up curves (FIG. 2) between 0 and $t_1$ and subtracting one from the other, thus $$\Delta A_S = V_e \int_0^{t_2} e^{at} dt + V_e(t_1 - t_2) - V_1 \int_0^{t_1} e^{at} dt \quad (4)$$

In this equation $V_e$ is the limiting amplitude of RF oscillations and it is assumed that the build-up of oscillation is accurately exponential (vide Whitehead) with time constant $1/a$.

Figure 2:
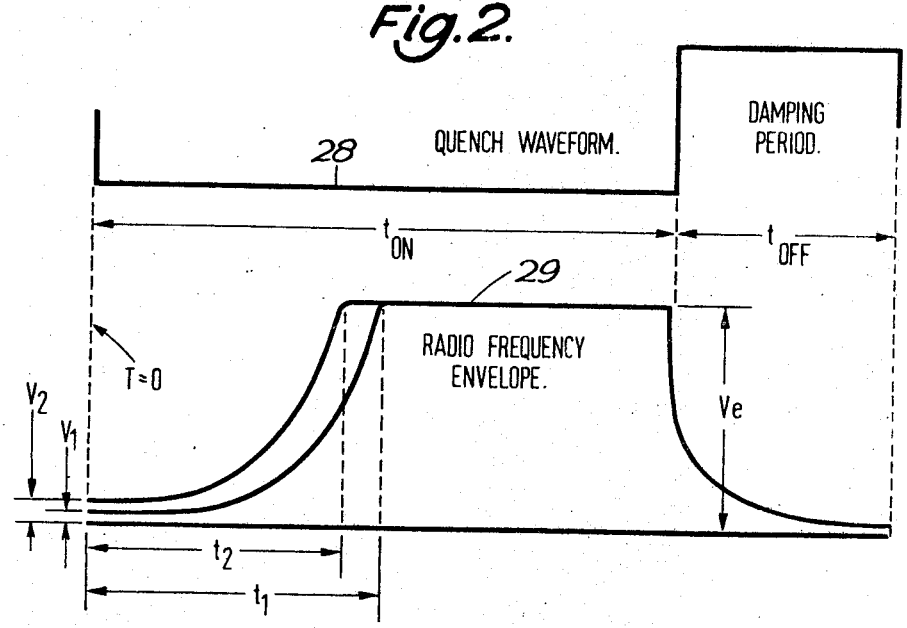
FIG. 2 is a waveform diagram.

From FIG. 2 it is clear that $$V_e = V_1 e^{at_1} = V_2 e^{at_2}$$

therefore Equation 4 can be simplified to $$\Delta A_S = \frac{1}{a}\left[V_e \ln \frac{V_2}{V_1} - (V_2 - V_1)\right] \quad (5)$$

Normally, the last term in Equation 5 is negligible compared to the logarithmic term; therefore the expression for $V_{out}$ becomes, $$V_{out} = k f_q \cdot \frac{V_e}{a} \cdot \ln \frac{V_2}{V_1} \quad (6)$$

It may be shown that:

$$a = \frac{G_1}{2C} \quad (7)$$

where $G_1$ is the effective negative conductance connected across the tank circuit, and $C$ is the total capacitance in the tank circuit.

If Equations 1, 2, 3 and 7 are incorporated in Equation 6, there is obtained:

$$V_{out} = k f_q \frac{2C}{G_1} V_e \ln \frac{2\overline{V}_n^2 = (\hat{V}_R = \hat{V}_I)^2}{2\overline{V}_n^2 + \hat{V}_R^2} \quad (8)$$

Most NQR signals are comparable to the noise voltages, whereas $V_R$ is larger because of the need to maintain a fairly high degree of coherence; therefore 8 can be written as $$V_{out} \simeq k f_q \frac{2C}{G_1} V_e \cdot \frac{\hat{V}_I}{V_R} \quad (9)$$

This shows that the response of the circuit in the coherent state is linear for small signals and is inversely proportional to $\hat{V}_R$.

In order to obtain the complete expression for $V_{out}$ it is necessary to evaluate $\hat{V}_R$. Referring again to FIG. 2 at the instant the damping pulse is applied, the envelope begins to decay. It can readily be shown that the decay is exponential, with time constant equal to $2C/G_0$, where $G_0$ is the circuit conductance while the damping pulse is applied. Therefore:

$$V = k' exp(-G_0 t/2C)$$

where $k'$ is a constant and $V$ is the peak-to-peak RF voltage at time $t$. Now, when $t=0$, $V = V_e = k'$, and at time $t = t_{OFF}$ $V' = V_2$. Thus, $$V_R = V_e exp(-G_0 t_{OFF}/2C) \qquad (10)$$

and substituting in Equation 9, we obtain $$V_{out} \simeq k f_q \frac{2C}{G_1} \hat{V}_I exp.(G_0 t_{OFF}/2C) \qquad (11)$$

Equation 11 describes many of the properties of a super-regenerative detector. It will be apparent that the gain of the circuit that is to say the ratio of $V_{out}/\hat{V}_I$ depends on the total capacitance $C$ of the tank circuit and hence on the operating frequency. Secondly, the reason for the wide variation of gain with quench frequency in previous spectrometers is apparent when it is considered that quench waveforms of constant mark-to-space ratio have invariably been hitherto used, so that $t_{OFF}$ has been inversely proportional to the quench frequency. According to the present invention, this effect is substantially eliminated by making $t_{OFF}$ independent of the quench frequency $f_q$ and preferably after perhaps an initial adjustment, constant. Then the gain of the detector or spectrometer will vary only slightly with the quench frequency and in a linear manner instead of exponentially. Thus with the present invention sideband suppression, by varying the quench frequency, can be achieved without any need for complicated compensation circuits. Finally, Equation 11 provides two parameters $G_0$ and $t_{OFF}$, which are both independent of the quench frequency and can therefore be used to provide automatic gain stabilisation at the same time that the quench frequency is being varied to suppress sidebands.

Figure 3:
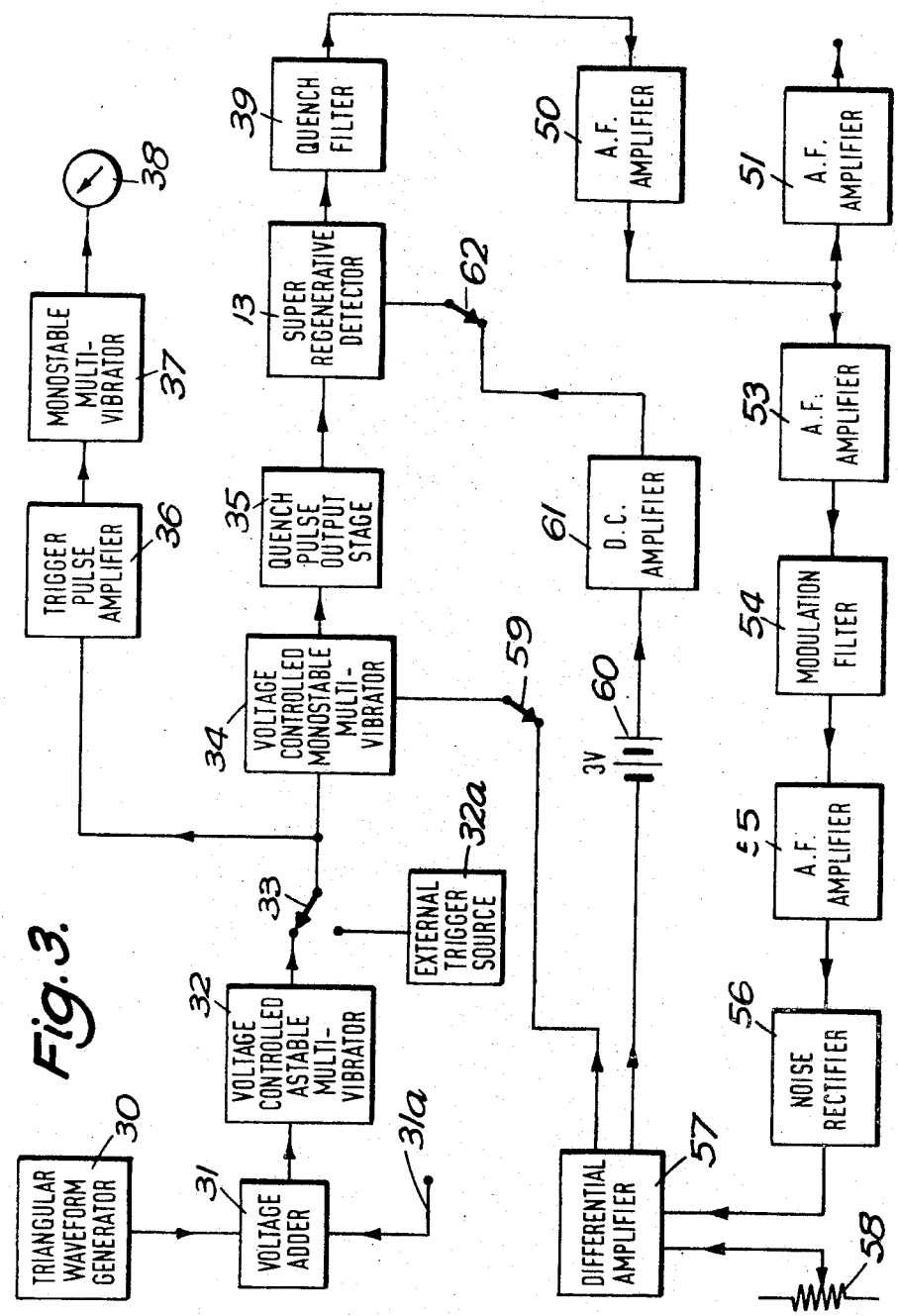
FIG. 3 illustrates diagrammatically one embodiment of the invention.
Figure 4:
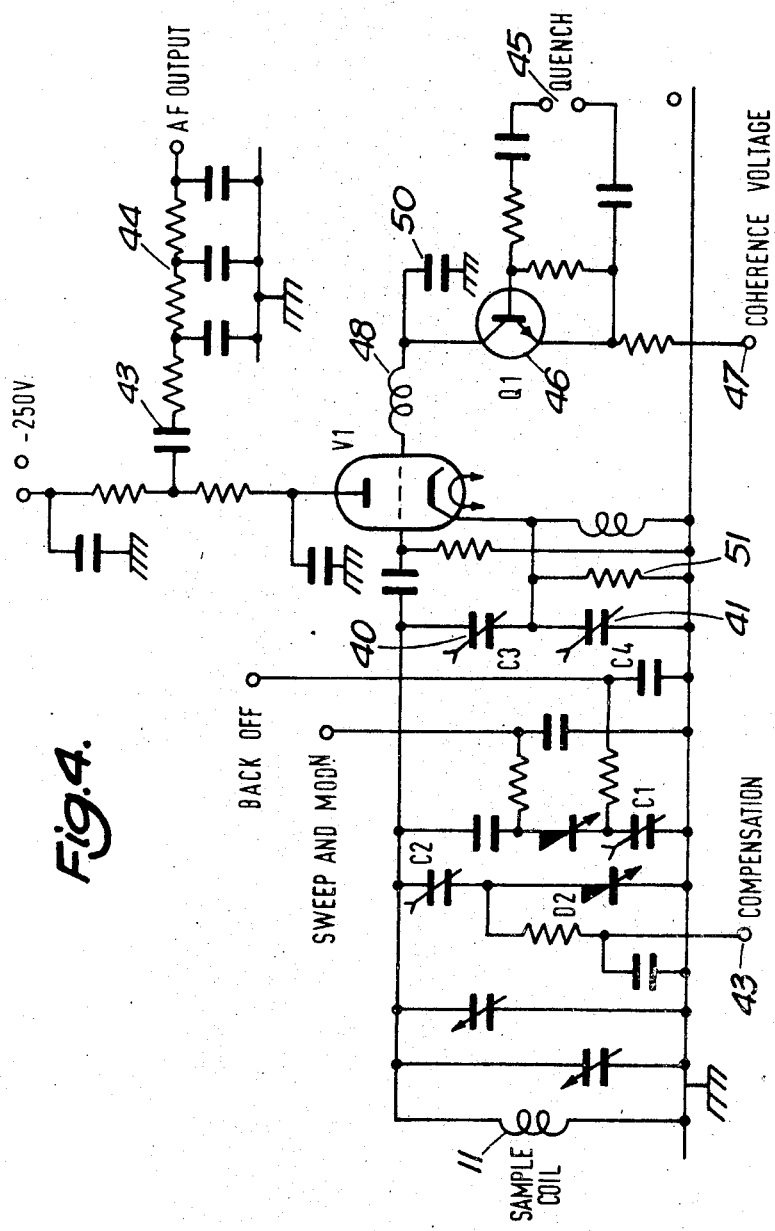
FIG. 4 is a circuit diagram illustrating in more detail the embodiment illustrated in FIG. 3.

In FIG. 3 is shown in block diagram form a resonance spectrometer incorporating the present invention. This spectrometer incorporates many of the features described with reference to FIG. 1 but which for convenience have not again been illustrated. There is provided as before a super-regenerative detector 13 which may incorporate a tank circuit and search coil arranged substantially as described with reference to FIG. 1. A suitable circuit for the detector 13 is shown in FIG. 4. In that figure, the valve $V_1$ is a triode valve arranged in a conventional Colpitts oscillator circuit, the positive feedback required to cause oscillations being derived from preset capacitors $C_3$ and $C_4$ forming a capacitative tap across the tank circuit formed by the search coil 11 and the capacitors 40 and 41. The output from the circuit is taken from the anode of $V_1$ which is at ground potential to radio frequencies via a capacitor 43 and an RC filter to remove quench frequencies. Quenching is accomplished by applying at the terminals 45 an appropriate waveform to render conductive or non-conductive an NPN transistor 46. This transistor acts as an on/off switch depending on whether the voltage applied between its base and emitter is positive or negative respectively. When the transistor is conducting, a voltage at the grid of $V_1$ is developed and the amplification of the valve $V_1$ is reduced. The extent of the reduction in gain, or damping, depends on a voltage applied to the terminal 47, this voltage gives a direct control over the intensity of the quenching action and is derived from the feedback circuit. When however the transistor is off the operation of the valve $V_1$ as a radio frequency oscillator is unimpeded and oscillations can build up in its tank circuit. The input at the terminals 45, which are coupled to the output of the quench oscillator might be a square wave or sinusoidal; in the present preferred embodiment the input waveform is derived from a monostable multivibrator and is approximately rectangular.

Before considering the generation of the quench waveform and the operation of the rest of the circuit shown in FIG. 3 a few more details of the oscillator unit in FIG. 4 will be described. An RF choke 48 is added between the collector of transistor Q1 and the grid of the valve $V_1$ to prevent the detection of high harmonics of the quench frequency as pseudo-resonances. In previous circuits sine wave quenching has been normally employed and such a choke is not necessary.

The effect of the radio frequency choke is increased by a 50 pf. capacitor 50 connected between the collector of transistor Q1 and earth. Another feature is the resistor 51 in parallel with the RF choke in the cathode circuit of valve $V_1$. During the on period the resistor has very little effect due to the low impedance level at the cathode but during the off period of the oscillator it helps to damp the oscillations in the tank circuit and permits a shorter damping period and hence a higher quench frequency for the same degree of coherence.

The functions of the unreferenced components in the circuit of FIG. 4 will be readily comprehended by those acquainted with such circuits.

Referring again to FIG. 3: there is provided a triangular voltage waveform generator 30 producing a triangular waveform which is fed to one input of a voltage adder 31 to the other input 31a of which may be fed an adjustable voltage. The output from the voltage adder 31 is used to control a voltage controlled astable multivibrator 32. With the voltage control just mentioned, the frequency of the astable multivibrator 32 will repetitively increase and decrease between limits determined by the sensitivity of the voltage control and the amplitude of the triangular waveform. The output from the astable multivibrator or an external trigger source 32a may be alternatively utilised by placing a switch 33 in appropriate positions. The switch 33 feeds the square wave firstly to a voltage controlled monostable multivibrator 34, whose output will be a waveform of variable frequency but of constant damping period whose length could be determined by appropriate adjustment of the passive components in the multivibrator but which is preferably altered from a suitable voltage control. The output from vibrator 34 is amplified by an amplifier 35 and fed to the detector 13 in the manner described with reference to FIG. 4.

The switch 33 also feeds the variable frequency waveform from the astable multivibrator 32 to a trigger pulse-amplifier 36 and thence to a monostable multivibrator 37 producing repetitive short pulses at the quench frequency. These pulses are used to drive a moving coil milliammeter 38 which may be calibrated from say, 0 to 100 kc./s.

The radio frequency oscillation in the detector 13 is modulated in the manner described with reference to FIG. 4. This can be accomplished in practice by applying the audio frequency waveform (as obtained from a generator like generator 22) across a varactor diode D1 (FIG. 4) to alter repetitively the capacitance of the tank circuit and hence the resonant frequency. It should be made clear that the oscillator of FIG. 4 may be swept in frequency by applying a gradually changing bias signal across the same diode D1.

The modulated output from the detector 13 is passed through a quench filter 39, amplified by an audio frequency amplifier 50 and fed through a further amplifier 51 to an output terminal 52 which may be coupled either to an oscilloscope or to a phase sensitive detector and associated circuits of the kind shown in FIG. 1. The output from the amplifier 50 is also amplified again in an amplifier 53 and then passed to a modulation filter 54 which removes all signals at the modulation frequency (280 cycles per second). This leaves only the random noise signals which are amplified by a further amplifier 55, rectified by a noise rectifier 56 and fed to one input of a differential amplifier 57 the other input of which is connected to the tap of an adjustable potentiometer 58. One output of the differential amplifier is used to control the damping period, being applied for this purpose through a switch 59 if automatic operation is desired. Another terminal of the switch 59 may couple the monostable multivibrator 34 to an external control voltage.

The other output of the differential amplifier 57 is augmented by a constant voltage from the battery 60 and amplified in a DC amplifier 61 and applied through a further switch 62 to the coherence voltage input terminal described with reference to FIG. 4.

The operation of the circuit shown in FIGS. 3 and 4 is conventional as far as the determination of absorption spectra are concerned. The oscillator frequency is varied for example by varying the voltage applied to the varactor diode D1 in the tank circuit of the oscillator of FIG. 4, the output of the detector being used to drive a conventional pen recorder recording amplitude of the output against oscillator frequency. Sideband suppression is achieved by varying the quench frequency at an appropriate rate faster than that to which the pen recorder can respond.

Automatic frequency calibration of the recorder may be achieved by the method described above.

We claim:

1. A spectrometer for detecting nuclear resonances in a material comprising a super-regenerative oscillator for generating pulse envelopes of radio frequency oscillations, means for applying said pulse envelopes to said material, detector means for detecting resonances produced in said material by said oscillations, quenching means coupled to said oscillator for quenching said oscillations during predetermined quenching periods, means coupled to said quenching means for varying the frequency of said periods, and coherence control means responsive to the output of said detector means and coupled to said quenching means for adjusting the durations of said periods independently of the frequency thereof to thereby stabilize the gain of the spectrometer.

2. A spectrometer as set forth in claim 1 wherein said quenching means includes a variable frequency pulse generator for applying quenching pulses to said oscillator and said coherence control means includes means for varying the durations of said pulses.

3. A spectrometer as set forth in claim 2 wherein said means for varying the frequency of said periods includes a waveform generator for generating a triangular waveform and means responsive to said triangular waveform for raising and lowering repetitively the frequency of said quenching pulses in accord with said triangular waveform.

4. A spectrometer as set forth in claim 1 wherein said coherence control means comprises noise detection means for detecting the noise level in said oscillations, means for providing a reference signal, means for comparing said noise level and said reference signal, means for sensing the difference between said noise level and said reference signal; and means for adjusting said durations of said damping periods so as to maintain the coherence of said oscillations.

5. A spectrometer for detecting nuclear resonances in a material comprising a super-regenerative oscillator for generating pulse envelopes of radio frequency oscillations; means for applying said pulse envelopes to said material; first frequency sweep means for varying the frequency of said oscillations; detector means for detecting resonances produced in said material by said oscillations, noise detection means responsive to said detector means for detecting the level of random noise in the output thereof; a variable frequency pulse generator means for applying periodic damping pulses to said oscillator so as to establish said pulse envelopes, said damping pulses having predetermined frequency and duration; second frequency sweep means for repetitively varying the frequency of said damping pulses; means for establishing a reference signal; means for comparing said level of random noise with said reference signal; means for sensing the difference between said level and said reference signal; and means coupled to said variable frequency pulse generator means for adjusting the duration of said damping pulses so as to maintain the coherence of said oscillations and thereby stabilize the gain of said spectrometer.

References Cited
UNITED STATES PATENTS 3,439,259   4/1969   Peterson _____ 324—0.5

OTHER REFERENCES

C. Dean—Feedback Coherence Control For Superregenerative Spectrometer—Rev. of Sci. Instr.—29(11)—November 1958, pp. 1047.

RUDOLPH V. ROLINEC, Primary Examiner

M. J. LYNCH, Assistant Examiner